United States Patent
Vers

[15] 3,701,197
[45] Oct. 31, 1972

[54] METHOD OF PROVIDING A PARTITION WALL IN THE CYLINDER OF A TELESCOPIC SUSPENSION UNIT

[72] Inventor: Rudi Vers, Heindenfeld, Germany
[73] Assignee: Fichtel & Sachs AG, Schweinfurt, Germany
[22] Filed: May 11, 1971
[21] Appl. No.: 142,131

[30] Foreign Application Priority Data
    May 14, 1970    Germany..........P 20 23 578.3

[52] U.S. Cl..................................29/522, 188/314
[51] Int. Cl........................B21d 39/00, B23p 11/00
[58] Field of Search.....................29/522; 188/314

[56] References Cited
UNITED STATES PATENTS

| | | |
|---|---|---|
| 2,630,964 | 3/1953 | Scheldorf..................29/522 X |
| 2,722,050 | 11/1955 | Shank..........................29/522 |
| 2,866,582 | 12/1958 | Punte et al............29/522 UX |
| 3,158,931 | 12/1964 | Shutt et al. ..................29/522 |

Primary Examiner—Charlie T. Moon
Attorney—Kelman & Berman

[57] ABSTRACT

A radial partition wall member is fixedly installed in the cylinder cavity of a telescopic suspension unit by positioning the wall member in the cylinder and axially compressing a hollow bead along the edge of the wall member until it spreads radially into frictional clamping engagement with the inner cylinder surface. Application of this method to the construction of two suspension units is described.

1 Claim, 3 Drawing Figures

PATENTED OCT 31 1972 3,701,197
Fig. 1 Fig. 2
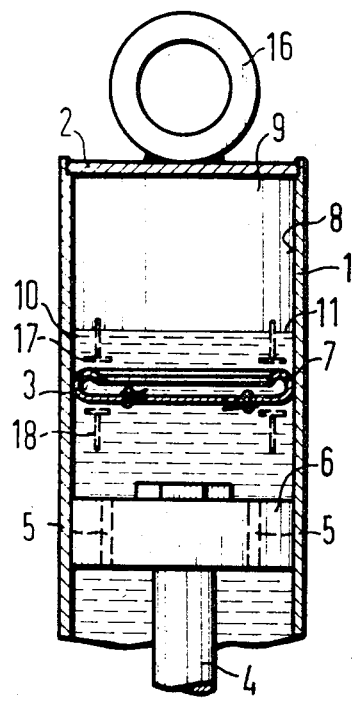
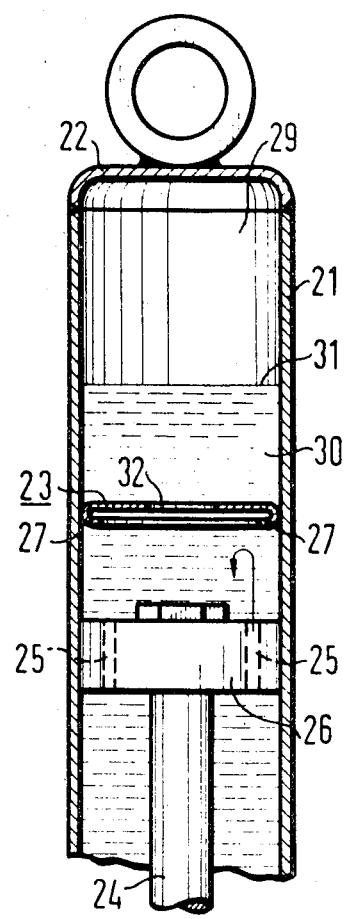
Fig. 3
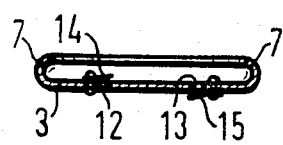
INVENTOR:
Rudi Vers
BY: Kelman and Berman
agents 3,701,197

METHOD OF PROVIDING A PARTITION WALL IN THE CYLINDER OF A TELESCOPIC SUSPENSION UNIT

This invention relates to telescopic suspension units, and particularly to a telescopic suspension unit equipped with a transverse wall member fixedly fastened in a compartment of the cylinder cavity axially bounded by a piston, and to a method of installing the wall member in the cylinder.

Transverse, fixed partition wall members are frequently employed in telescopic suspension units for automotive and other vehicles. It has been common practice heretofore to install such a wall member in the cylinder by welded or soldered seams. It has also been proposed to secure the partition wall axially in the cylinder by ribs or other projections on the inner cylinder wall produced by forming indentations in the outer cylinder wall. The known methods of installing such a wall member are limited to cylinder materials which may safely be heated to the temperatures necessary for soldering or welding, or which are sufficiently thin to permit the last-mentioned method and sufficiently rigid to make a useful cylinder regardless of the relatively small thickness.

A primary object of the invention is the provision of a transverse wall member which may be installed simply and precisely in a cylinder of any desired material and any desired thickness in any desired axial position.

According to one of its more specific aspects, the invention relates to an improvement in a suspension unit including a cylinder whose cavity receives an axially moving piston formed with an axial throttling passage, the cylinder bounding a compartment in the cavity. A wall member is fixedly fastened in the compartment and extends transversely of the cylinder axis.

The wall member of the invention has an edge portion which constitutes an approximately toroidally curved, hollow bead extending in a closed loop about the cylinder axis. An outer convex face of the bead engages the smoothly cylindrical inner cylinder surface under a radial pressure sufficient to frictionally hold the wall member in a fixed axial position in the cavity.

According to another aspect of the invention, the wall member is first installed in the tubular cylinder member by positioning the wall in the tubular member in a plane transverse to the axis of the latter. An edge portion of the wall member constitutes an approximately toroidally curved, hollow bead which extends in a closed loop about the afore-mentioned axis and initially has an outer diameter through the axis sufficiently smaller than the inner diameter of the tubular member to permit axial insertion of the wall member. The bead is then axially compressed until its outer diameter is increased so that it engages the tubular member with a pressure sufficient to anchor the wall member in a fixed axial position.

Other features, additional objects, and many of the attendant advantages of this invention will readily become apparent from the following detailed description of preferred embodiments when considered in connection with the appended drawing in which:

FIG. 1 shows a first suspension unit of the invention in fragmentary elevational section on its axis;

FIG. 2 shows a second suspension unit of the invention in the manner of FIG. 1; and FIG. 3 shows a partition wall of the invention prior to its installation in the unit of FIG. 1.

Referring now to the drawing in detail, and initially to FIG. 1, there is shown as much of a hydropneumatic suspension unit as is needed for an understanding of this invention. The unit has a cylinder 1 closed at one end by a flat, radial end wall 2 welded to the cylinder 1 and imperforate. A partition wall 3 is fixedly mounted in the cylinder at some distance below the end wall 2.

A piston rod 4 enters the cylinder cavity through the non-illustrated other radial end wall of the cylinder and is fixedly fastened to a piston 6 which axially divides the cylinder cavity into an upper compartment and a lower compartment only partly seen in the drawing. Axial throttling passages 5 in the piston 6 connect the two compartments.

The metallic partition wall 3 is held in its fixed axial position in the upper compartment by the pressure with which an outer convex face of a hollow bead 7 frictionally engages the inner surface 8 of the cylinder 1. The bead 7 is constituted by an integral edge portion of the wall 3 which is approximately toroidally curved, the bead 7 being open toward the cylinder axis and of uniform, approximately U-shaped cross sections in all axial planes.

The space in the cylinder cavity above the wall 3 is partly occupied by a gas cushion 9, and the remainder of the cylinder cavity is filled with a liquid 10, such as oil or hydraulic shock absorber fluid, in direct contact with the gas cushion 9. The interface 11 of the gas and liquid is transverse to the cylinder axis, and perpendicular thereto in the illustrated position of the cylinder 1.

As is better seen in FIG. 3, the otherwise imperforate center portion of the wall 3 remote from the bead 7 has a smaller, axial throttling aperture 12, and a somewhat larger throttling aperture 13. Leaf springs 14, 15 mounted on opposite faces of the wall 3 near the apertures 12, 13 respectively provide check valves which impede liquid flow in a downward axial direction through the aperture 12 and upward axial flow through the aperture 13, while permitting fluid flow in the respective opposite axial directions. A fastening eye 16 on the end wall 2 and a corresponding, non-illustrated eye on the piston rod 4 permit the unit of FIG. 1 to be interposed between the sprung and unsprung masses of a vehicle in the usual manner.

In assembling the suspension unit shown in FIG. 1, the partition wall 3, while in the shape shown in FIG. 3, is axially inserted into the cylinder 1. At this stage, the bead 7 has the approximate shape of one half of a tore or anchor ring, and its outer convex surface extends in an arc of not quite 180° in the sectional view of FIG. 3. The outer diameter of the wall 3 is slightly smaller than the inner cylinder diameter. Once positioned at the desired axial level in the cylinder cavity at right angles to the cylinder axis, the partition wall 3 is compressed axially between annular clamping tools 17, 18, indicated in broken lines in FIG. 1. The axial compression increases the arcuate length of the bead 7 to more than 180°, as seen in FIG. 1, and increases the outer diameter of the wall 3 until its outer convex face is jammed against the inner cylinder surface 8 with a pressure sufficient to hold the partition wall 3 in the desired fixed axial position in the tubular cylinder 1.

The other elements of the suspension unit seen in FIG. 1 and those omitted from the showing of FIG. 1 are installed after withdrawal of the tools 17, 18 in a conventional manner not directly relevant to this invention.

The mode of operation of the unit illustrated in FIG. 1 is known in itself. When the piston rod 4 moves inward of the cylinder 1 and the added length of the piston rod occupies space in the cylinder, liquid flows through the passage 12, and the gas cushion 9 is correspondingly compressed. The liquid flow and the ensuing axial movement of the piston 6 are damped by the throttling effect of the narrow aperture 12, the aperture 13 being blocked by the check valve 15. During outward movement of the piston rod 4, liquid flows relatively freely through the larger aperture 13 in the wall 3.

A similar suspension unit is shown in FIG. 2, and elements corresponding to those of the unit described above with reference to FIG. 1 have been provided with the same reference numerals augmented by 20.

The cylinder 21 is closed at one axial end by an imperforate cover 22 butt-welded to the cylinder 21. A partition wall 23 is arranged axially between the cover 22 and a piston 26 mounted on a piston rod 24 and provided with axial throttling passages 25. The partition wall 23 is held in the illustrated axial position by its toroidally arcuate edge portion 27 which forms a hollow bead expanded by axial compression as described above with reference to FIGS. 1 and 3.

The upper cylinder compartment is downwardly bounded by the piston 24, and the part of the compartment above the partition wall 23 is partly filled by a gas cushion 29, the remainder of the cylinder cavity being occupied by a liquid 30 in direct contact with the gas cushion 29 along a horizontal interface 31 at right angles to the cylinder axis.

The suspension unit, as far as illustrated in FIG. 2, differs from that described above in more detail with reference to FIG. 1 by a central aperture 32 in the partition wall 23, the central aperture having a diameter of approximately one third of the cylinder diameter. The more peripheral annular portion of the partition wall between the aperture 32 and the edge 27 is imperforate and axially aligned with the orifices of the throttling passages 25 in the cylinder 26.

When the piston rod 24 moves axially inward of the cylinder 21, liquid is forced through the piston passages 25 and discharged from the upper orifices of the passages at relatively high speed. The streams of liquid impinge on the imperforate annular portion of the partition wall 23 and are deflected so that their energy is spent in turbulence as indicated in FIG. 3 by a bent arrow. In the absence of the partition wall 23, the liquid streams would break through the interface 31 and produce a foam of liquid and gas which would interfere with the proper functioning of the unit.

It should be understood, of course, that the above disclosure relates only to preferred embodiments of the invention herein chosen for the purpose of the disclosure, and that it is intended to cover all changes and modifications of the examples of the invention herein chosen for the purpose of the disclosure which do not constitute departures from the spirit and scope of the invention set forth in the appended claims.

What is claimed is:
1. A method of fixedly installing a transverse wall member in a tubular cylindrical member which comprises:
   a. positioning said wall member in said tubular member in a plane transverse to the axis of said tubular member,
      1. said wall member having an edge portion constituting an approximately toroidally curved, hollow bead extending in a closed loop about said axis,
      2. said bead having an outer diameter through said axis sufficiently smaller than the inner diameter of said tubular member to permit axial insertion of said wall member in said tubular member; and
   b. axially compressing said bead until the outer diameter thereof is increased and said bead engages said tubular member with a pressure sufficient to hold said wall member in a fixed axial position in said tubular member.

* * * * *